United States Patent [19]

Chatterjea

[11] 4,262,969
[45] Apr. 21, 1981

[54] BRAKE CONTROL WITH PILOT ACTUATION

[75] Inventor: Probir K. Chatterjea, Mount Prospect, Ill.

[73] Assignee: International Harvester Company, Chicago, Ill.

[21] Appl. No.: 47,520

[22] Filed: Jun. 8, 1979

[51] Int. Cl.³ .............................................. B60T 13/22
[52] U.S. Cl. ..................................... 303/71; 303/6 M
[58] Field of Search .......................... 303/71; 188/170; 303/10, 6 M; 60/562; 137/636

[56] References Cited
U.S. PATENT DOCUMENTS 3,976,333  8/1976  Fillion et al. ....................... 303/71 X
4,159,854  7/1979  Peterson ............................... 303/6 M

*Primary Examiner*—Douglas C. Butler
*Attorney, Agent, or Firm*—Ronald C. Kamp; F. David AuBuchon

[57] ABSTRACT

A control for a spring-apply, pressure release brake system having a pilot signal-generating valve and a slave brake valve interconnected by a pilot signal line. Hydraulic pressure is directed to both the pilot valve and the slave valve. Manual stroking of the pilot valve modulates the pressure to the signal line. A spool within the slave valve senses both the signal pressure and the brake pressure and moves to an equilibrium position to equalize the signal and brake pressures.

8 Claims, 2 Drawing Figures

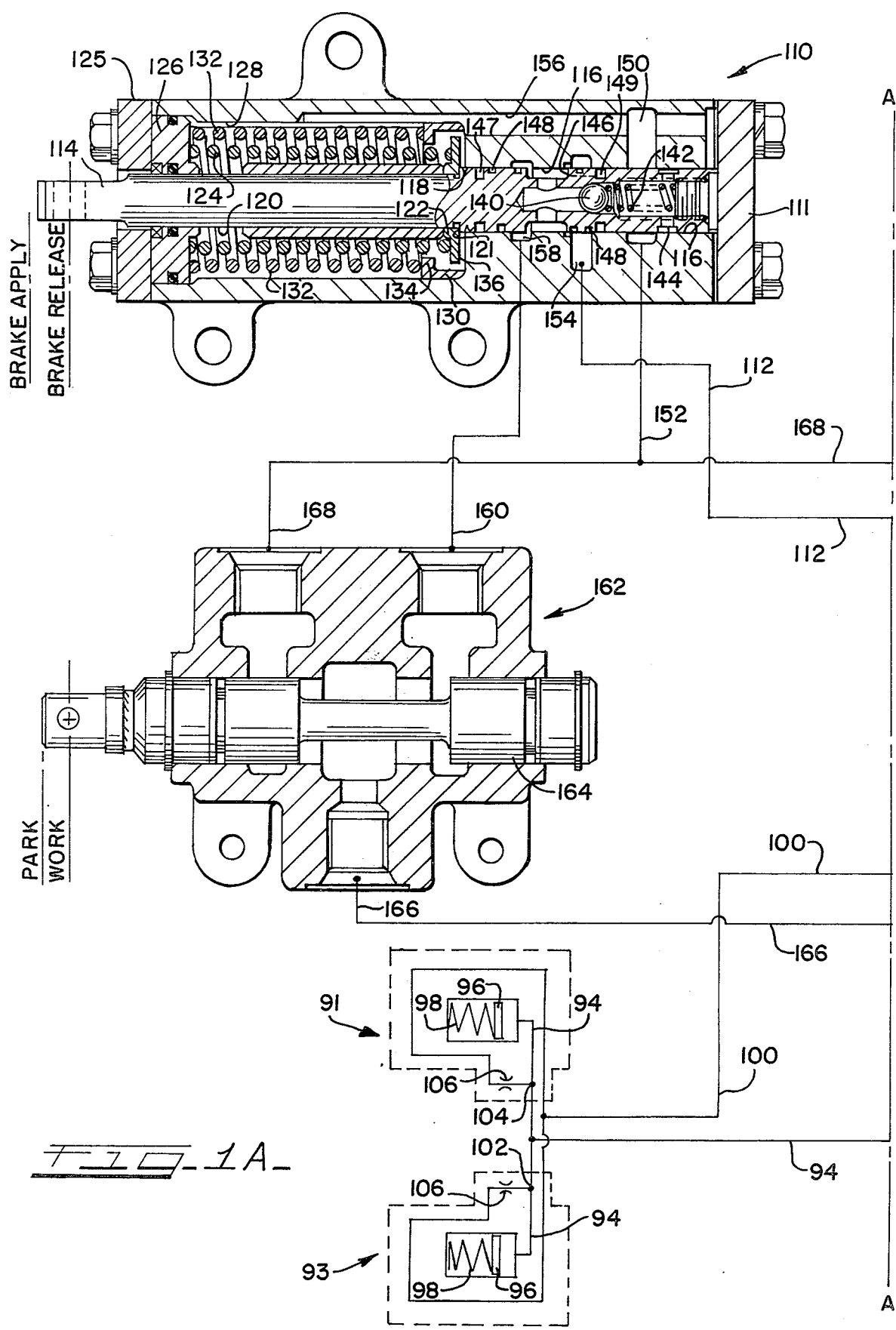

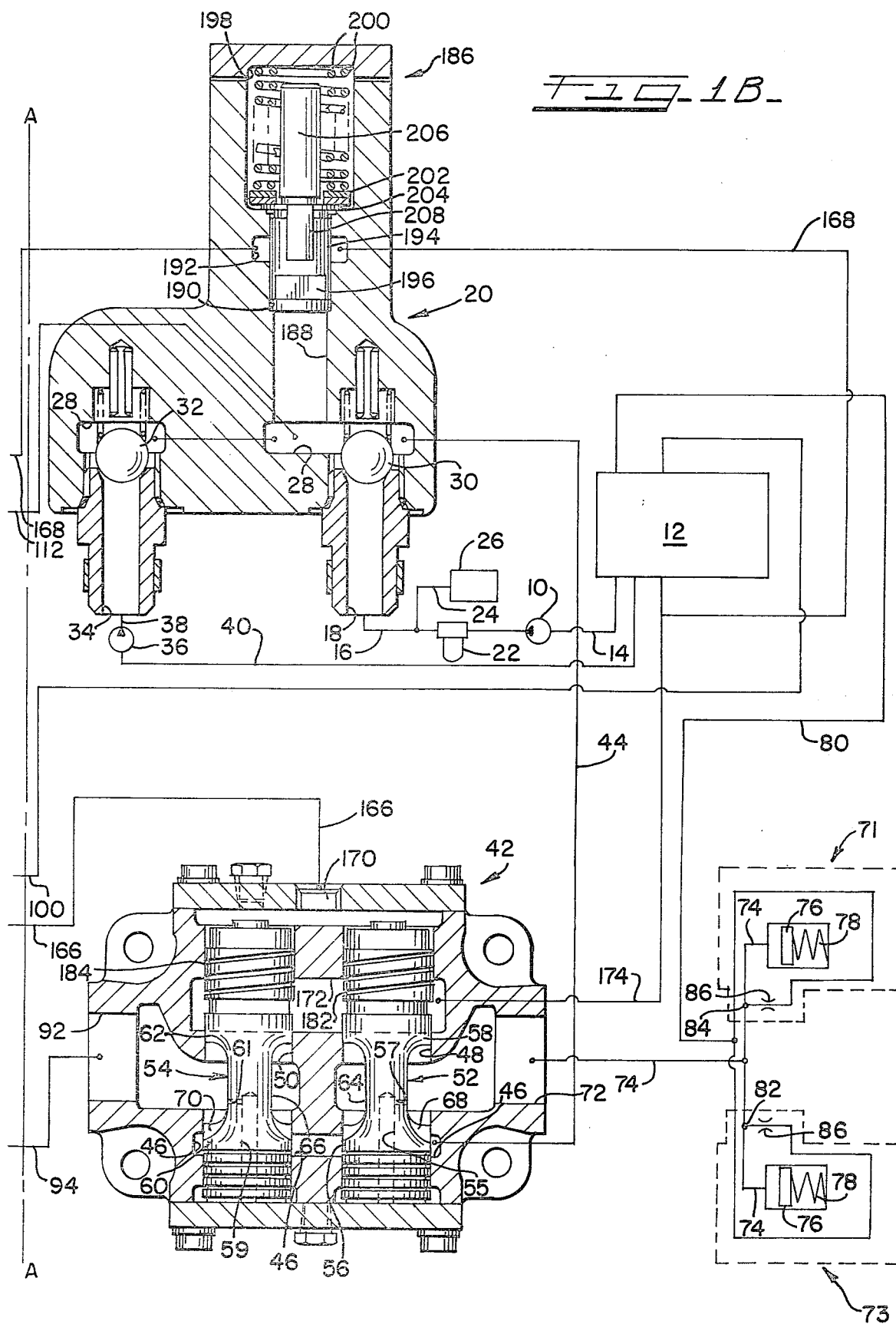

BRAKE CONTROL WITH PILOT ACTUATION

BACKGROUND AND SUMMARY OF THE INVENTION

Spring-applied, pressure-released brakes have certain inherent advantages, such as automatic application upon loss of release pressure. The usefulness of such brakes however, has been hindered by the difficulty in providing a means for controlling the application of the brakes, i.e. so that the brakes are applied smoothly and predictably. On some vehicles, such as construction equipment, which are commonly provided with hydraulically actuated tools, the most convenient medium for release of the brakes is the readily available hydraulic pressure. However, the viscosity of hydraulic fluid varies with temperature, further complicating the control of such brakes when utilized on vehicles of this type. Also certain types of construction equipment are provided with articulated frames for steering which introduces still further difficulties, particularly when the pressure source and the operator compartment are located on different frame sections. The reason for this difficulty is due to the need for rapid evacuation of the brake cylinders in order to achieve quick brake response. This requirement dictates the location of the brake valve in close physical proximity to the hydraulic pump and reservoir, while the brake pedal obviously must be located in the operator compartment which often is on the other frame section.

It is, therefore, an object of this invention to provide a means for controlling a spring-apply, pressure-release brake system which permits a smooth and predictable application of the brake and still has a normal "feel" for an operator thereof.

It is also an object to provide such a control means which utilizes hydraulic fluid as the pressure medium and in which the temperature effects are minimized.

It is another object to provide such a control means which permits a quick response and yet is utilizable on an articulated vehicle without the need for complicated mechanicial connections between the operator compartment and the brake valve.

It is still another object to provide such a control means which permits towing of the vehicle when the engine thereof is not operating or release pressure normally available is otherwise lost.

It is also an object to provide such a control means which permits positive application of the spring-applied brakes for maintenance and repair, and which precludes accidential or inadvertent release thereof.

It is also an object to provide such a control means which will permit application of at least a portion of the brake system even through another portion of the system may have failed.

These and other objects of the present invention, and many of the attendant advantages thereof, will become more readily apparent from a persual of the following description in connection with the accompanying drawings wherein:

FIG. 1A and 1B, combined, represent a hydraulic schematic of a preferred embodiment of the invention as applied to an articulated loader.

DESCRIPTION OF A PREFERRED EMBODIMENT

Referring now to the drawings, a pump 10, driven by an engine (not shown), draws hydraulic fluid from a reservoir 12, through conduit 14. Hydraulic fluid under pressure is discharged from the pump 10 through conduit 16 into port 18 of valve body 20. A filter 22 may be interposed in conduit 16 between the pump 10 and the port 18. A conduit 24 connects with conduit 16 downstream of the filter 22 and leads to a transmission regulator valve 26, which valve regulates the pressure within a predetermined range to provide pressurized lubrication to other vehicle components. The valve body 20 has a main cavity 28 with a check valve 30 positioned therein to permit flow of fluid only from port 18 into the main cavity 28.

A second check valve 32 permits flow only from a second port 34 into the main cavity 28. A second pump 36 which preferably is driven by an electric motor (not shown) supplies, when operating, hydraulic fluid under pressure to the port 34 through conduit 38. A supply line 40 connects the inlet of pump 36 to the reservoir 12. The second pump 36 is needed only in the absence of pressurized fluid flow from the pump 10, such as when the engine driving pump 10 is not operating, in order to release the spring-applied brakes to permit towing of the vehicle. The check valves 30 and 32 automatically permit either pump to charge the cavity 28 while sealing off the non-pressurized one of the ports 18 and 34.

The main cavity 28 is connected to the slave or brake valve, indicated generally at 42, by a conduit 44 which communicates with pressure port 46. The brake valve includes a pair of bores 48 and 50 in which metering spools 52 and 54 are respectively mounted to shift axially. The spool 52 has lands 56 and 58 on either end interconnected by a reduced diameter central portion 64. Spool 54 is similar in construction with lands 60 and 62 on either end interconnected by a reduced diameter central portion 66.

Metering slots 68 are provided on spool 52 at the transition from the land 56 to the reduced diameter portion 64. Similarly, metering slots 70 are provided on spool 54 at the transition from the land 60 to the portion 66. When the spool 52 is in its lowered position, as shown in the drawing, the metering slots 68 permit communication between the pressure port 46 and the outlet port 72 in the brake valve 42. This communication permits pressure from the pump 10 to be transmitted through the conduit 74 which branches to the brake canisters 71 and 73 on the rear of the vehicle.

These canisters are represented schematically by a piston 76 which is biased toward the left, as shown in the drawings by a spring 78 to apply the brakes. The brakes are released by pressure applied to the piston 76 through conduit 74. A continious flow of fluid through the metering slots 68 is assured by connecting a conduit 80 between the reservoir 12 and the conduit 74, the conduit 80 branching and connecting with conduit 74 at 82 and 84. A small orifice 86 in each of the branches of conduit 80 restricts this continuous flow to a small amount.

Similarly, when the spool 54 is in its lowered position, as shown in the drawings, the metering slots 70 permit force communication between the pressure port 46 and the outlet port 92 in the brake valve 42. This permits pump pressure to be transmitted through the conduit 94 which branches to the brake canisters 91 and 93 on the front of the vehicle. Similar to the rear canisters, the front canisters 91 and 93 each have a piston 96 which is biased toward the right to apply position by a spring 98. A conduit 100 is connected between the reservoir 12 and the conduit 94, the conduit 100 branching and connecting with conduit 94 at 102 and 104, with orifices 106 in each of the branches of conduit 100 permitting a restricted flow to the reservoir.

The metering slots 68 and 70 restrict the maximum flow from port 46 to outlet ports 72 and 92 respectively. Otherwise, at low engine speeds when the pump output is greatly reduced, all of the pump flow would be required to fill the brake canisters 71, 73, 91, and 93 while the brakes are being released. Should this be permitted to occur, the large flow to the canisters, during a time when pump output is at a minimum, would have dropped the pump pressure, as well as the signal pressure to be described hereinafter, very low. The metering slots 68 and 70 by restricting the flow from the pressure port 46 to the outlet ports 72 and 92 maintain the pressure to the brake canisters at an acceptable level even though the pump output is greatly reduced.

A pilot signal-generating valve, indicated generally at 110, has a spool 114 that is axial reciprocable within a bore 116. The spool 114 has a reduced-diameter section at 120 forming a shoulder 121. A spring retainer 122 is positioned on the section at 120 and is engagable with shoulder 121. A compression spring 124 is trapped between the retainer 122 and the gland member 126 which is held in place on the body of valve 110 by end cap 125 bolted thereto. This arrangement urges the spool 114 toward the right, as viewed in the drawing. The gland member 126 seals off a counterbore in the valve body 110 defining a cylindrical spring cavity 128. A second spring retainer 130 is slidably mounted in the cylindrical cavity 125 and a second spring 132 is trapped between the end of the retainer 130 and the member 126.

The spring retainer 130 has a flange 134 which projects inward to permit engagement with the outward projecting flange 136 on the retainer 122 as the spool 114 is moved outwardly. Since the two flanges 134 and 136 are spaced apart axially when the retainer 122 is bottomed against shoulder 138 and retainer 130 is bottomed against the blind end of cavity 128, the spool 114 must travel outward a small amount, during which only spring 124 is compressed, before the flanges engage and cause both springs 124 and 132 to be compressed. The effort increase caused thereby provides the operator with a better "feel" for the braking action in conjunction with the relief valve arrangement in the spool 114.

The relief valve arrangement comprises a ball valve 140 which is seated by a spring 142. The spring side of valve 140 communicates with an annular groove 144 in spool 114, and the other side of valve 140 communicates with an annular groove 146. A helical groove 148 is provided on the spool 114 and extends on either side of the annular groove 146. For manufacturing convenience, the helical groove 148 may terminate in slightly larger annular grooves such as those shown at 147 and 149.

The body of valve 110 has a core 150 connected to reservoir 12 through conduits 152 and 168, and a core 154 to which the pressure conduit 112 communicates. The spring cavity 128 is always connected to reservoir 12 through passage 156 which intersects both the cavity 128 and core 150. Signal core 158 provides communication between the bore 116 and conduit 160.

When the spool 114 is urged by the spring 124 toward the end cap 111, the pressure from the pump 10 will be communicated through conduit 112 to the core 154, and through helical groove 148 and annular groove 146, to the core 158 and conduit 160. This pressure releases the brakes in a manner to be described hereinafter. The helical groove 148 is blocked from communication with the spring cavity 128 and the annular groove 144 is blocked from the core 150. As the spool 114 is moved to the left, as by an operator pushing on a pedal attached by linkage to this spool in a well known manner, the grooves 147 and 148 are connected to reservoir through the spring cavity 128. Under this condition pressure form the core 154 will bleed off to drain through the helical groove 148, creating a pressure gradient along the groove. In the initial part of the stroke, the signal pressure is dropped rapidly to a preset valve by dumping it over the valve 140. The annular groove 144 is connected to drain by communication with core 150 after a small preset travel. The signal pressure dwells at this level for a certain length of stroke. This pressure provides a very slight gentle braking operation or response. At this point, the spring 132 is picked up by engagement of the flanges 134 and 136, which results in an effort increase which enables the operator to feather the brakes in order to readily maneuver in close quarters. Further, stroking gradually reduces the signal pressure at core 158.

The conduit 160 connects with a diverter valve 162 having a spool 164, which is movable between an inward "work" position and an outward "park" position. In its inward position as shown in the drawing, the conduit 160 connects with signal conduit 166, while communication between conduits 160 and 168 is blocked. When the spool 164 is pulled outward to its "park" position conduits 160 and 168 are connected and conduits 160 and 166 are isolated from each other. The signal pressure to brake valve 42 is therefore blocked and conduit 160 is connected to reservoir 12 through conduit 168. The signal conduit 166 connects with port 170 which port communicates with the upper ends of bores 48 and 50 and hence on the end of lands 58 and 62 of spools 52 and 54 respectively. A core 172 interconnects both bores 48 and 50 and connects with the reservoir 12 through conduit 174. The lands 58 and 62 of spools 52 and 54 respectively each have a helical groove 182 and 184 which function as bleed orifices between the inlet 170 and the core 172 which permits a small flow of oil through the pilot valve and signal line to aid in warming cold oil. In this connection, it should also be noted that a shallow groove 118 is provided on the periphery of spool 114. This shallow groove always provides communication between the control grooves 148 and the spring cavity 128 which permits a small flow of oil to pass through the valve 110 and back to the reservoir. This flow helps to minimize the effect of temperature upon operation of the brakes.

The signal or input pressure communicated to the port 170 in valve 42 acts on the top of spools 52 and 54. The brake or output pressure acts on the bottom of these spools through the passages 55 and 57 in spool 52 and the passages 59 and 61 in spool 54. Any unbalance between the signal pressure and the brake pressure will shift these spools upward or downward to respectively decrease or increase brake or output pressure and thereby the pressure acting on the bottom of the spools 52 and 54. These spools always shift to adjust the brake pressure to the signal pressure, the latter being controlled by the operator through movement of the spool 114 in the pilot valve 110.

The valve 20 also includes a regulator valve 186 which maintains the pressure to the pilot valve at a desired level, e.g. 30-50 psi above the pressure level of regulator 26. A bore 188 communicates with the cavity 28 and a counterbore 190 intersects a core 192 to which conduit 168 connects. A spool 194 is slidable in the counterbore 190 and is provided with a flat 196 which permits metering of fluid from the cavity 28 to the core 192 and hence to the reservoir. A spring cavity 198 is aligned with the counterbore 190 and contains a pair of compression springs 200. These springs push on a washer 202 which reacts on a flange 204 secured between the spool 194 and a spring guide 206. Another flat 208 provides for a constant connection between the cavity 198 and the core 192 and hence to the reservoir. The pressure in the cavity 28, which is provided by either the engine-drive pump 10 or the emergency electric pump 36, acts on the bottom of the spool 194 urging the spool upward against the bias of springs 200. When the pressure force on the bottom of spool 194 exceeds the spring force, the spool 194 will move upward exposing the flat 196 to the core 192 and thereby permitting the flow of hydraulic fluid through the conduit 168 to the reservoir 12. The flat 196 meters this flow as the spool moves in the counterbore 190 to maintain the pressure in the cavity 28 at a predetermined level.

In practice the invention may be utilized on an articulated vehicle, such as a rubber-tired loader. The drawing indicates a preferred arrangement of the components on such a vehicle; the vehicle's axis of articulation being indicated by the line A—A and the components on the left thereof, i.e. those in FIG. 1A, positioned on the front section of the articulated frame and the components on the right thereof, i.e. those in FIG. 1B, positioned on the rear section. The operator's station may conveniently be positioned on the front section, which would permit simplification of the mechanical connection between the pilot valve spool 114 and the brake pedal in the operation station. The valve 162 can be positioned near the operator's station to facilitate control thereof with relatively simple linkage. The connection between the pump 10 and the brake valve 42 must be capable of transmitting a high volume of pressurized fluid. The desirability of a quick response dictates a relatively short connection therebetween. Placement of these components near the engine on the rear section satisfies those requirements.

It should be noted that the use of two spools 52 and 54 permits the complete separation of the front and rear brake sections. The benefit of this is that a malfunction in one spool and/or its associated circuit will not affect the other.

While one embodiment of the present invention is shown and described herein, it is contemplated that various changes and modifications may be made therein without departing from the spirit of the invention as defined by the scope of the appended claims.

What is claimed is:

1. In a vehicle having a spring-apply, pressure release brake, a source of hydraulic pressure, and a reservoir, an improved control means for application of said brake, comprising:
   a slave valve having an outlet port, an inlet port connected to said source and a bore extending therebetween;
   a first conduit connecting said outlet port with said brake;
   a second conduit having an orifice therein connected between said first conduit and the reservoir;
   a brake spool axially slideable in said bore and having a land on each end connected by a reduced diameter portion;
   metering slots on one land for metering pressure from said inlet port to said outlet port;
   passage means in said brake spool to communicate brake pressure against the end of said one land;
   a pilot valve for generating a signal pressure;
   a signal conduit connecting said pilot valve to said slave valve to direct said signal pressure against the end of the other of said lands; and
   said metering slots and said orifice arranged to always permit a small flow of fluid from said source through said first and second conduits to the reservoir.

2. A control means according to claim 1, wherein said pilot valve comprises:
   a housing;
   a pilot spool reciprocably mounted in said housing and connected to be reciprocated by an operator;
   and a spring-seated valve for dropping the signal pressure to the slave valve to a predetermined value upon initial movement of said spool to apply said brakes.

3. A control means according to claim 2 wherein said pilot valve further comprises:
   a first spring within said housing and engaging said pilot spool to oppose movement of said spool in the brake-apply direction; and
   a second spring within said housing capable of engaging said pilot spool after a predetermined amount of pilot spool travel to increase the operator effort required to shift the pilot spool in a brake-apply direction.

4. A control means according to claims 3, wherein said pilot spool is provided with a helical control groove on its periphery:
   said control groove determining the signal pressure as the pilot spool is reciprocated.

5. A control means according to claims 1 or 8 and further comprising:
   a tow valve, having a park position and a work position, interposed between said pilot valve and said slave valve, said tow valve in its park position isolating said slave valve from said pilot valve and its work position connecting said pilot valve to said slave valve.

6. A control means according to claims 1 or 8 wherein said pressure source comprises:
   an engine driven pump;
   an electric motor driven pump;
   a pair of check valves arranged to permit operating one of said pumps to transmit hydraulic pressure to said pilot and slave valves while isolating the other of said pumps therefrom.

7. A control means according to claims 1 or 8 wherein said pilot valve and said slave valve includes means for permitting circulation of hydraulic fluid therethrough in order to minimize the effects of temperature on operation of the brakes.

8. In an articulated vehicle having front and rear sections with a pair of brake canisters on each section, a source of hydraulic pressure and a reservoir, each of said brake canisters including a spring-apply, pressure release brake;
   an improved control means for application of said brakes comprising:

a slave valve having a pair of separate outlet ports, an inlet port connected to said source and a pair of bores, each bore extending between the inlet port and one of said outlet ports;

first conduits separately connecting one of the outlet ports with one pair of brake canisters on said sections;

second conduits connecting with the reservoir and with said first conduits within each brake canister;

an orifice interposed in said second conduits in each of said brake canisters;

a pair of brake spools axially slideable in said bores;

each of said spools having a land on each end connected by a reduced diameter portion and metering slots on one land for metering pressure from said inlet port to the associated outlet port;

passage means in each brake spool to communicate brake pressure in the associated outlet port against the end of said one land;

a pilot valve for generating a signal pressure;

a signal conduit connecting said pilot valve to said slave valve to direct said signal pressure against the ends of said spools with the other of said lands; and said metering slots and said orifices arranged to always permit a small flow of fluid from said source through said conduits to the reservoir.

* * * * *